(12) United States Patent
Otsuka

(10) Patent No.: US 8,856,422 B2
(45) Date of Patent: Oct. 7, 2014

(54) MEMORY CARD CONTROLLER, MEMORY CARD ADAPTOR AND MEMORY CARD DRIVE

(75) Inventor: Takeshi Otsuka, Hyogo (JP)

(73) Assignee: Panasonic Corporation, Osaka (JP)

(*) Notice: Subject to any disclaimer, the term of this patent is extended or adjusted under 35 U.S.C. 154(b) by 36 days.

(21) Appl. No.: 13/302,018

(22) Filed: Nov. 22, 2011

(65) Prior Publication Data

US 2012/0331337 A1 Dec. 27, 2012

(30) Foreign Application Priority Data

Jun. 23, 2011 (JP) .................................. 2011-139089
Nov. 8, 2011 (JP) .................................. 2011-244448

(51) Int. Cl.
 *G06F 13/00* (2006.01)
 *G06F 11/10* (2006.01)
 *G06F 13/16* (2006.01)

(52) U.S. Cl.
 CPC ............... *G06F 11/10* (2013.01); *G06F 13/16* (2013.01)
 USPC ........................................... 711/100; 710/35

(58) Field of Classification Search
 USPC ................................................. 711/115, 154
 See application file for complete search history.

(56) References Cited

U.S. PATENT DOCUMENTS

2007/0204077 A1* 8/2007 Ootsuka et al. ................. 710/35
2010/0049878 A1* 2/2010 Yu et al. .......................... 710/11

FOREIGN PATENT DOCUMENTS

JP 4323476 6/2009

\* cited by examiner

*Primary Examiner* — April Y Blair
*Assistant Examiner* — Trang Ta
(74) *Attorney, Agent, or Firm* — Wenderoth, Lind & Ponack, L.L.P.

(57) ABSTRACT

A memory card controller includes a receiver, a flow controller, a continuity determination unit, and a command controller. When size of data transferred from the memory card reaches transfer size specified by first read command, the command controller controls the flow controller to transmit a response representing a transfer busy state, and pauses a transfer operation of the memory card. When the receiver receives a second read command in a state that the transfer operation of the memory card is paused, the command controller controls the flow controller to transmit a response representing transfer ready state to the transfer authorization request from the memory card so as to restart a transfer operation of the memory card.

9 Claims, 6 Drawing Sheets

MEMORY CARD CONTROLLER, MEMORY CARD ADAPTOR AND MEMORY CARD DRIVE

BACKGROUND

1. Technical Field

The present invention relates to a memory card controller for controlling data transfer between a host apparatus and a memory card.

2. Related Art

According to price reduction and speed-up of flash memories, video data are being recorded in a memory card not only in a field of consumer devices but also in a field of video devices for professional use.

Video data recorded in a memory card is uploaded from the memory card to a server in order to edit and archive the data. Video data to be used for professional uses have large capacity. For this reason, a reading speed of data from the memory card is requested to be, for example, a several times as high as a writing speed.

In a memory card using a flash memory or the like of which number of rewriting times is limited, in order to average the number of rewriting times, a correspondence between logical addresses and physical addresses of a nonvolatile memory in the memory card is dynamically controlled. For this reason, a logical-physical conversion table described with a correspondence between the logical addresses and the physical addresses is recorded in the nonvolatile memory. In such a configuration, a reading operation of the memory card includes two steps composed of a process for reading a physical address corresponding to a logical address specified by referring to the logical-physical conversion table, and a process for reading actual data based on the read physical address.

A reading size (transfer size) of a read command issued by a host device such as a general-purpose PC to a memory card is comparatively small. For this reason, an overhead relating to the command and an overhead relating to the logical-physical conversion table cannot be ignored.

In Japanese Patent No. 4323476, when an amount of read data reaches a data amount specified by a read command, a memory card controller pauses the reading operation. When a head address specified by a following read command is continuous with a transfer end address specified by a preceding command, the reading operation is restarted. Stopping and restarting of the reading operation are controlled by stopping and supply of a clock.

As a result, when a command for requesting data transfer to continuous regions is issued sequentially from the host apparatus, a transfer start command does not have to be issued every time when the command is received. For this reason, data transfer at a higher speed is realized.

In recent years, according to speed-up of an interface of a flash memory, a high-speed serial interface is being adopted as an external interface of a memory card. For example, a high-speed interface UHS-II of which transfer speed is 3 Gbps is standardized for SD cards.

In such a high-speed interface standard, clocks and data are not separately transferred unlike conventional memory cards, and clocks are reproduced from transferred data to be used (an embedded clock system).

Therefore, to such a high-speed interface standard, the method for stopping clocks for pausing the transfer to control the data transfer like the conventional technique disclosed in Japanese Patent No. 4323476 cannot be applied.

It is an object of the present invention to provide a memory card controller, a memory card adaptor and a memory card drive that can improve a transfer speed at the time of reading of data even when instruction of reading from a host apparatus is executed by a read command with short data length in a memory card adopting an embedded clock system.

SUMMARY

According to the first aspect of the invention, a memory card controller for controlling data transfer between a host apparatus which issues a read command to request the data transfer and a memory card is provided. The memory card controller includes a receiver operable to receive a read command from the host apparatus, the read command specifying a transfer size and a transfer start address of the data transfer, a flow controller operable to control the data transfer with the memory card by responding to a transfer authorization request from the memory card, a continuity determination unit operable to determine continuity between a transfer end address specified by a read command previously received and a transfer start address specified by a read command received next in two read commands sequentially received from the host apparatus via the receiver, and a command controller operable to issue a transfer command to the memory card according to the read command. When the receiver receives a first read command, the command controller issues a transfer command to the memory card to cause the memory card to start data transfer, while specifying a transfer start address specified by the first read command and a predetermined transfer size larger than a transfer size specified by the first read command. When size of data transferred from the memory card to the host apparatus in response to the transfer command reaches the transfer size specified by the first read command, the command controller controls the flow controller to transmit a response representing a transfer busy state to the transfer authorization request from the memory card, and pauses a transfer operation of the memory card. When the receiver receives a second read command in a state that the transfer operation of the memory card is paused and the continuity determination unit determines that the transfer start address represented by the second read command is continuous with the transfer end address represented by the first read command, the command controller controls the flow controller to transmit a response representing transfer ready state to the transfer authorization request from the memory card so as to restart a transfer operation of the memory card.

According to the second aspect of the invention, a memory card adaptor for controlling data transfer between a host apparatus and a memory card is provided. The memory card adaptor includes a card slot to which the memory card is attachable, the memory card controller according to the first aspect operable to control data transfer from the memory card, and an external interface unit operable to transmit and receive data and commands to and from the host apparatus.

According to the third aspect of the invention, a memory card drive for transferring data according to a request from the host apparatus is provided. The memory card drive includes a memory card operable to store data, the memory card controller according to the first aspect operable to control transfer of data from the memory card, and an external interface unit operable to transmit and receive data and commands to and from the host apparatus.

Effect of the Invention

According to the memory card controller, the memory card adaptor and the memory card drive regarding the respective aspects of the present invention, even when the read command is sequentially issued from the host apparatus, as long as the addresses specified by these read commands have continuity, a read command is issued to the memory card only when a first read command is issued from the host apparatus. For this reason, the reading process can be prevented from being delayed due to occurrence of overhead.

DETAILED DESCRIPTION OF PREFERRED EMBODIMENT

1. Configuration

Figure 1:
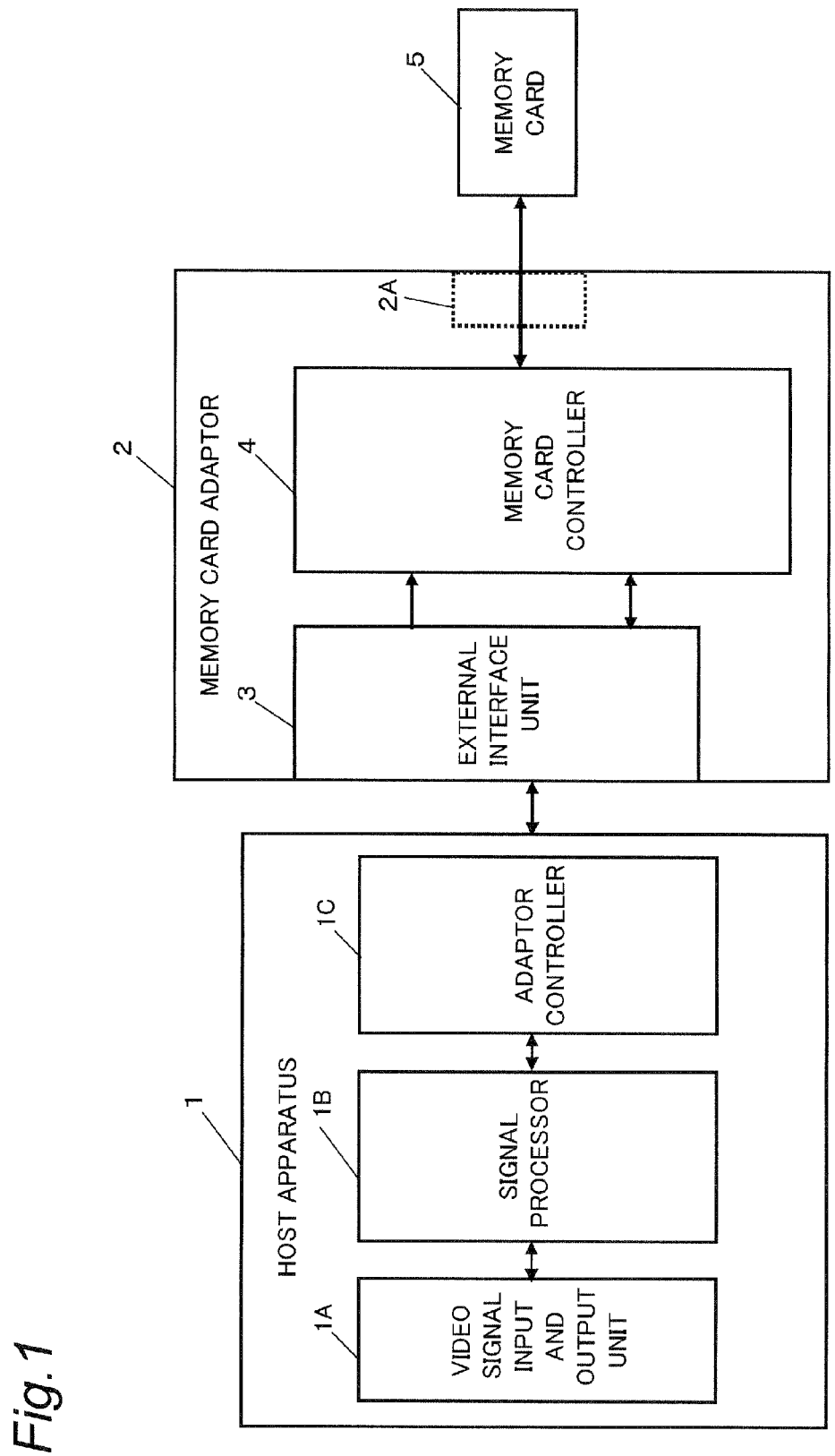
FIG. 1 is a drawing illustrating a configuration of a recording and reproducing system of a video signal including a memory card adaptor according to an embodiment.

A memory card adaptor according to an embodiment of the present invention will be described below. At first, a configuration of a recording and reproducing system of a video signal including the memory card adaptor according to the embodiment will be described. FIG. 1 is a block diagram illustrating the configuration of the recording and reproducing system of a video signal including the memory card adaptor according to the embodiment. As shown in FIG. 1, the recording and reproducing system of a video signal includes a host apparatus 1, a memory card adaptor 2, and a memory card 5. The memory card adaptor 2 is provided for an application for recording a video signal to the memory card 5 inserted into the memory card adaptor 2 or reproducing a video signal recorded in the memory card 5, in the recording and reproducing system of a video signal. This embodiment will describe a case where an SD card is used as the memory card 5.

The host apparatus 1 has a video signal input and output unit 1a, a signal processor 1b, and an adaptor controller 1c. The signal processor 1b compresses and restores a video signal to be transmitted and received by the video signal input and output unit 1a. The adaptor controller 1c controls the memory card adaptor 2.

The memory card adaptor 2 has a card slot 2a, an external interface unit 3, and a memory card controller 4. The memory card 5 can be attached into the card slot 2a. The attached memory card 5 is electrically connected to the memory card adaptor 2.

The memory card 5 is a high-speed memory card having an interface of an embedded clock system, and has two serial interfaces. The embedded clock system is a system for extracting a clock from data transferred and reproducing the clock. A data input interface to the memory card 5 is denoted by D0, and a data output interface from the memory card 5 is denoted by D1. The memory card 5 contains a logical-physical conversion table in which a correspondence between logical addresses and physical addresses of a nonvolatile memory including in the memory card 5 is recorded.

2. Operations 2-1. Recording Operation

A recording operation of the memory card 5 will be described. At the time of data recording, the host apparatus 1 issues a write command which specifies a logical address of a writing head and a writing size in the memory card 5 to the memory card adaptor 2. When receiving the write command from the host apparatus 1, the memory card controller 4 converts the logical address of the writing head and the writing size specified by the host apparatus 1 into a write instruction according to a protocol of the memory card 5, to issue the write instruction to the memory card 5.

When the host apparatus 1 asserts the write instruction, the memory card 5 reads the logical-physical conversion table. When reading the logical-physical conversion table, the memory card 5 writes transferred data into the nonvolatile memory according to the logical and physical conversion table. When the writing of the data of the specified writing size is completed, the memory card controller 4 updates the logical-physical conversion table, and asserts a transfer completion interrupt representing the completion of the writing to the host apparatus 1.

2-2. Reproducing Operation

A reproducing operation of the memory card 5 will be described. At the time of reproducing, the host apparatus 1 issues a read command which specifies a reading head logical address and a reading size in the memory card 5 to the memory card adaptor 2. When receiving the read command from the host apparatus 1, the memory card controller 4 converts the reading head logical address and the reading size (transfer size) specified by the host apparatus 1 into a read instruction according to a protocol of data reading of the memory card 5. The memory card 5 that receives the read instruction reads the logical-physical conversion table in order to convert the reading head logical address into a physical address in the nonvolatile memory in the memory card 5. When the logical and physical conversion table is read, the memory card controller 4 converts the logical address into the physical address based on the logical-physical conversion table, and reads desired data from the physical addresses of the nonvolatile memory. When the reading of the data with the specified transfer size from the memory card 5 is completed, the memory card controller 4 (the memory card adaptor 2) ends the reading process, and asserts a transfer completion interrupt representing the completion of the reading process to the host apparatus 1.

A series of steps from reception of the command from the host apparatus 1 to the assertion of the transfer completion interrupt by the memory card controller 4 (memory card adaptor 2) is referred as a "process". In one process, one reading of the logical-physical conversion table is generated. For this reason, when the number of the processes increases, a bad influence of overhead becomes noticeable.

The host apparatus 1 issues a command based on ATA (Advanced Technology Attachment) standards to the memory card adaptor 2 to perform reading and writing from and into the memory card 5. In this embodiment, a video device is assumed as the host apparatus 1, but when the ATA commands are used as described above, the embodiment can be applied also to a case where a personal computer or the like is used as the host apparatus 1. The host apparatus 1 recognizes the memory card 5 connected to the memory card adaptor 2 as a virtual drive, and determines logical addresses of sectors as recording and reproducing destinations and the number of writing sectors (writing size), then issues the ATA command. The "sectors" have corresponds to recording blocks in the memory card 5 in a one-to-one relationship. The ATA command is a command originally for disc media. For this reason, the writing destination and the like are expressed by the "sector".

Figure 2:
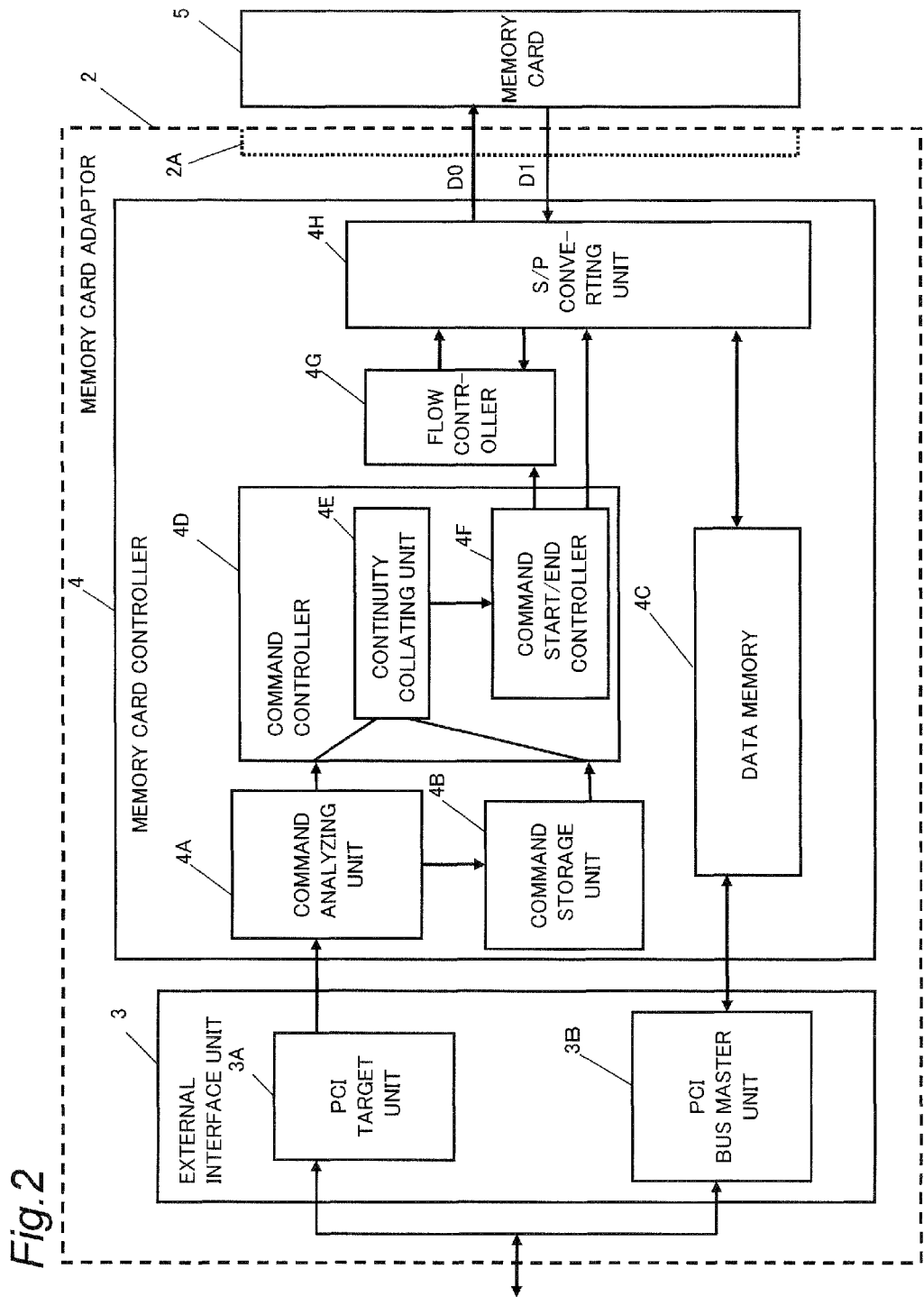
FIG. 2 is a drawing illustrating a configuration of the memory card adaptor according to the embodiment.

2-3. Operation of the Memory Card Adaptor 2-3-1. Configuration of the Memory Card Adaptor Before the operation of the memory card adaptor will be described, a configuration of the memory card adaptor will be described. The configuration of the memory card adaptor 2 will be described in more detail with reference to FIG. 2. FIG. 2 is a drawing illustrating the configuration of the memory card adaptor according to the embodiment.

As shown in FIG. 2, the external interface unit 3 has a PCI target unit 3a and a PCI bus master unit 3b. The external interface unit 3 transmits and receives data to and from the host apparatus 1 according to a card bus standard. The PCI target unit 3a transmits and receives commands to and from the host apparatus 1. The PCI bus master unit 3b transmits and receives data to and from the host apparatus 1. At the time of the transmission and reception of data to and from the host apparatus 1, the PCI bus master unit 3b operates as a bus master to execute DMA transfer to the host apparatus 1. Executing the DMA transfer in the data transmission and reception is for improving a transfer speed.

The memory card controller 4 has a command analyzing unit 4a, a command storage unit 4b, a data memory 4c, a command controller 4d, a flow controller 4g, and an S/P (Serial/Parallel) converting unit 4h. The command analyzing unit 4a analyzes a command transmitted from the PCI target unit 3a. The command storage unit 4b stores a command transferred just before the command transferred at this time. The data memory 4c is a buffer memory that functions as a buffer when data is transferred between the memory card 5 and the PCI bus master unit 3b of the external interface unit 3. The command controller 4d has a continuity determination unit 4e and a command start/end controller 4f. The continuity determination unit 4e collates (determines) continuity between a logical address represented by a command transferred this time and a logical address represented by a transferred command just before this transfer. The command start/end controller 4f issues an instruction relating to data transfer to the flow controller 4g based on the collated result in the continuity determination unit 4e. The flow controller 4g sends a response such as a packet indicating a ready state of transfer (referred as "a transfer ready packet"), a packet indicating a busy state of transfer (referred as "a transfer busy packet"), a packet indicating a abort state of transfer (referred as "a abort packet" and the like, for a data transfer authorization request packet from the memory card 5. The S/P converting unit 4h executes a serializing process which packetizes a control signal for flow control and user data in order to transfer the signal and the data to the memory card 5. Further, the S/P converting unit 4h executes a parallelizing process which extracts a control signal for flow control and user data from serial data that is transferred from the memory card 5 to the memory card controller 4.

2-3-2. Flow Control

Figure 3:
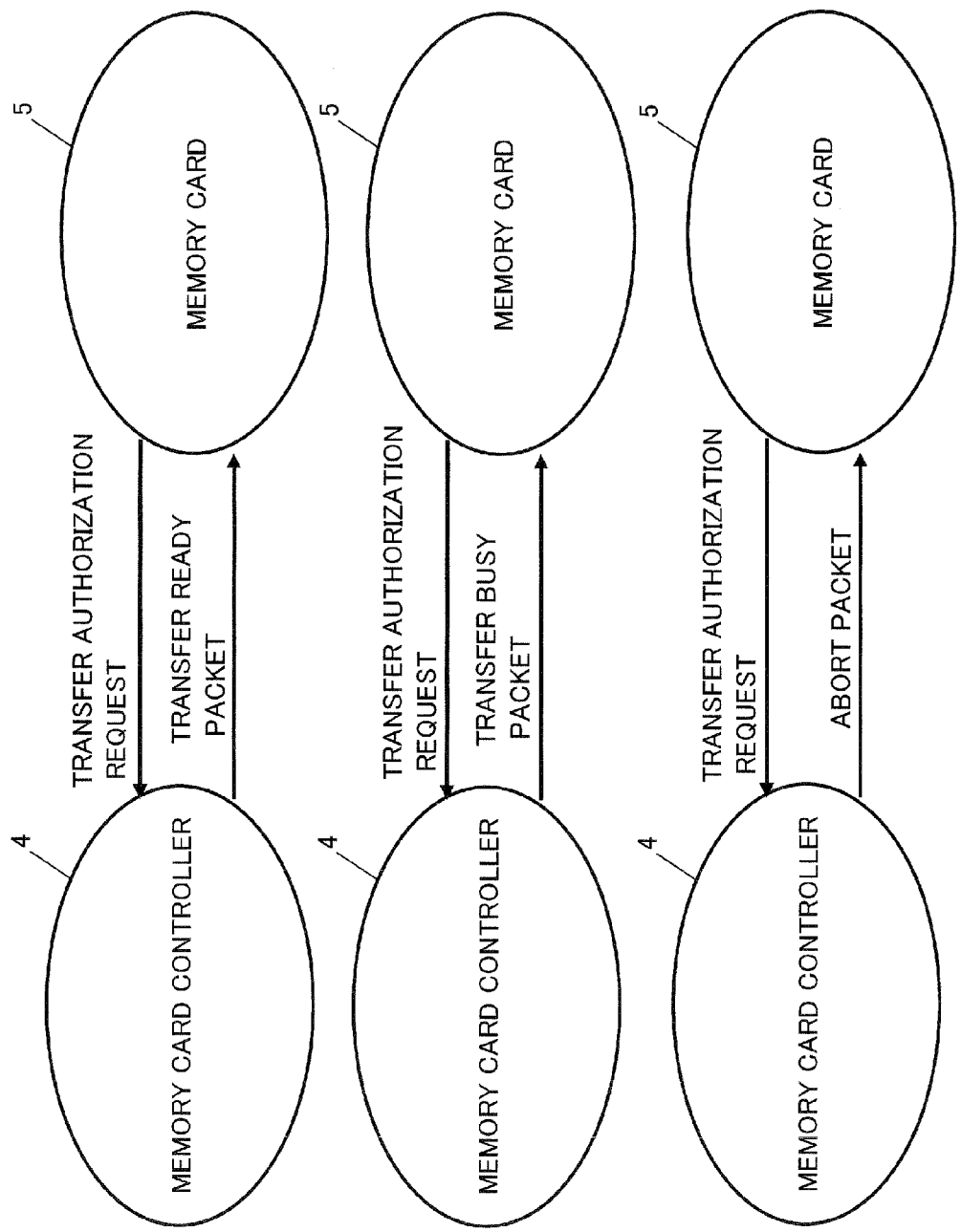
FIGS. 3A to 3C are explanatory diagrams illustrating flow control by a memory card controller according to the embodiment.

Flow control will be described with reference to FIG. 3. FIG. 3 is an explanatory diagram illustrating flow control by the memory card controller. In executing the flow control, a unit of transaction of the flow control is determined by referring to a memory capacity usable in the memory card 5 and the memory card controller 4. For example, the transaction of the flow control is 1 KB, a packet related to the flow control is transmitted and received at every transfer of 1 KB. When a transfer size from the memory card 5 is 16 KB, the flow control is made 16 times.

First, the memory card controller 4 issues the read command to the memory card 5.

When receiving the read command, the memory card 5 prepares for reading, and when the transfer of data of a transfer unit (for example, 1 KB) is enabled, the memory card 5 issues a transfer authorization request packet to the memory card controller 4. The memory card controller 4 responds to the transfer authorization request packet in the following three patterns:

(Pattern 1) respond using a transfer ready packet (FIG. 3A);

(Pattern 2) respond using a transfer busy packet (FIG. 3B); and (Pattern 3) respond using a abort packet (FIG. 3C).

Regarding the response using the transfer busy packet in the pattern 2, no response may be made for transfer busy state. Further, in the case of the response using the abort packet in the pattern 3, not only the flow control but also a process according to a memory card command related to current transfer may be aborted.

The flow control is made in such a manner and the transfer is controlled by a predetermined unit of 1 KB or the like, and thus the flow control can cope with restriction of the memory capacity and fluctuation of the transfer speed in the memory card 5 and the data memory 4c of the memory card controller 4.

2-3-3. Operation

Figure 4:
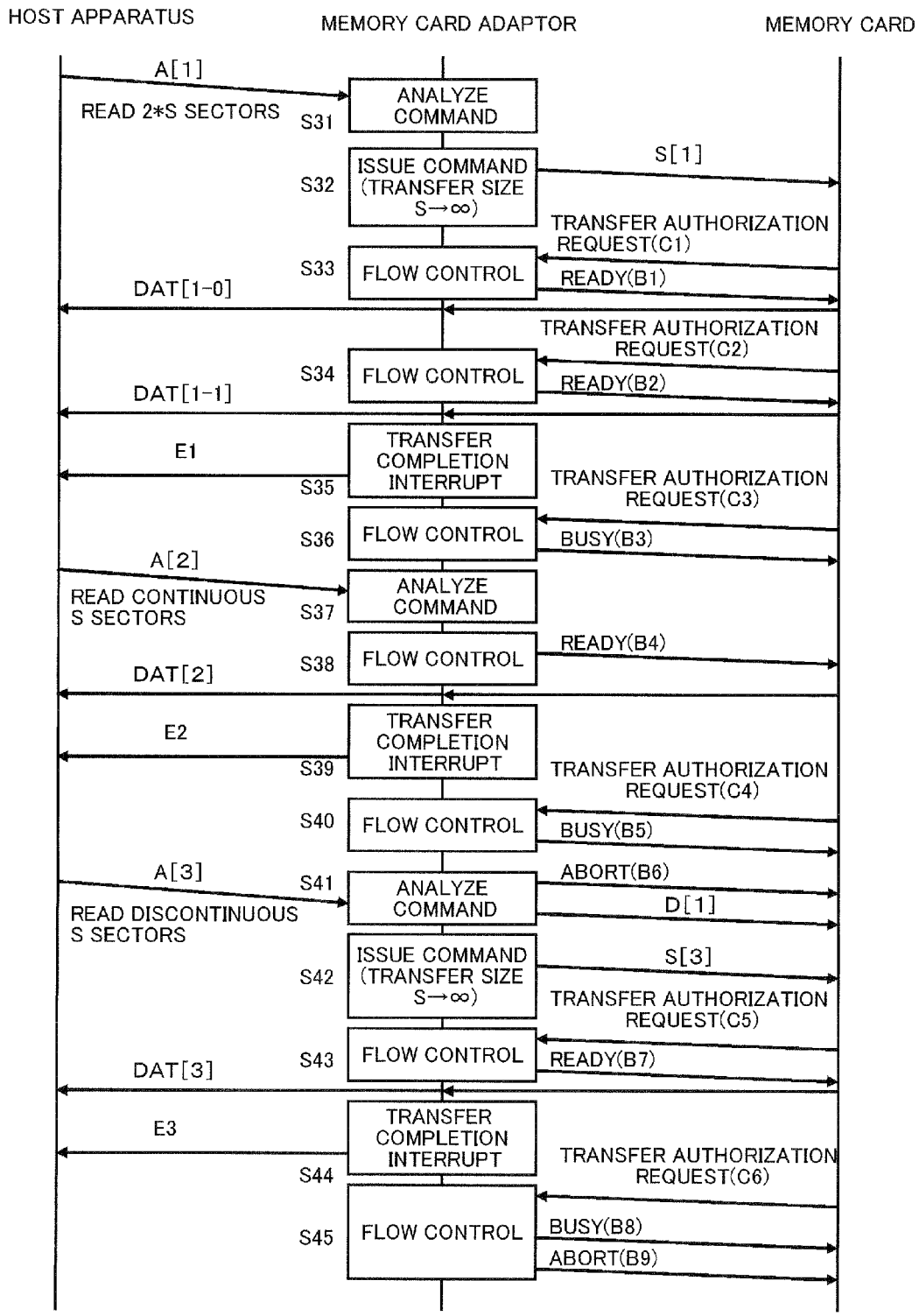
FIG. 4 is a drawing illustrating a flow of a process in the memory card controller according to the embodiment.

An operation of the memory card adaptor 2 having the above configuration will be described in detail with reference to FIG. 4 and FIGS. 5(a) to 5(f). FIG. 4 illustrates a process flow of the memory card controller 4, and FIGS. 5(a) to 5(f) are timing charts of a main part of the memory card controller 4.

In FIG. 4 and FIGS. 5(a) to 5(f), A[k] (k: natural number) represents a k-th ATA command, and DAT[k-m] represents m-th data packet in data transfer related to the k-th ATA command (m is counted starting from 0). S[k] represents a command of the memory card 5 corresponding to the k-th ATA command.

Figure 5:
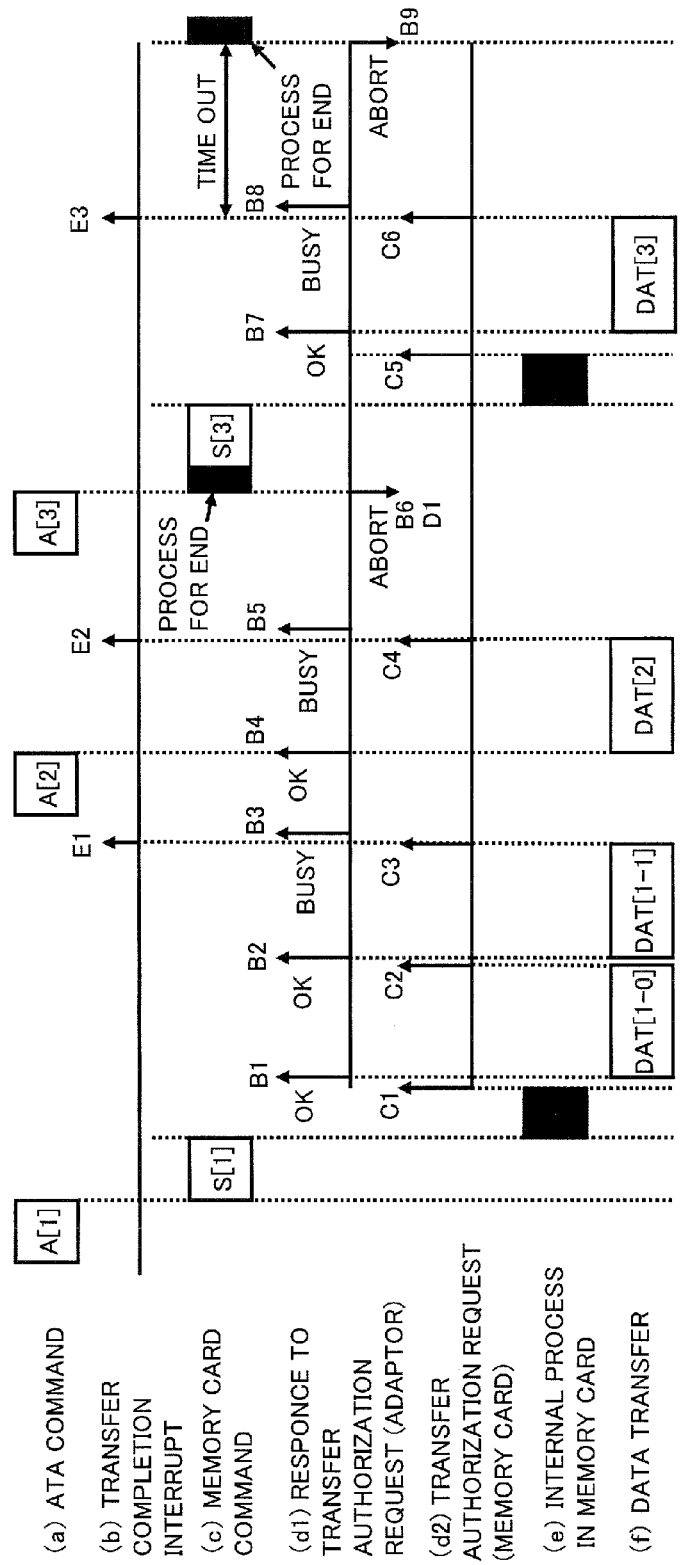
FIGS. 5(a) to 5(f) are timing charts illustrating a process in the memory card controller according to the embodiment.

FIG. 5(a) illustrates timing of the ATA command issued from the host apparatus 1, and FIG. 5(b) illustrates timing of transfer completion interrupt that represents completion of the transfer corresponding to the ATA command. FIG. 5(c) illustrates issue timing of the memory card command. FIG. 5(d1) illustrates timing of a response of the memory card controller 4 to the transfer authorization request packet from the memory card 5. FIG. 5(d2) illustrates timing of the transfer authorization request from the memory card 5. FIG. 5(e) illustrates timing of an internal process of the memory card. FIG. 5(f) illustrates timing of the data transfer. The internal process of the memory card in FIG. 5(e) is a process for referring to a physical address based on a logical address of a reading destination using the logical-physical conversion table.

In FIG. 4 and FIGS. 5(a) to 5(f), A[1] represents an ATA command for requesting reading and transfer of data for 8 sectors, and A[2] and A[3] represent ATA commands for requesting reading and transfer of data for 4 sectors. The flow control for the transfer is made in a unit of 4 sectors. A transfer end sector number in the read and transfer command A[1] is continuous with a transfer start sector number (transfer start address) in the read and transfer command A[2]. However, a transfer end sector number (transfer end address) in the read and transfer command A[2] is not continuous with a transfer start sector number in the read and transfer command A[3].

When the ATA command A[1] that is issued by the host apparatus 1 and includes a reading instruction, a head logical address and the number of reading sectors (the number of transfer sectors) is received, the command analyzing unit 4a analyzes A[1] to determine A[1] as the read command (S31). The command controller 4d issues the memory card command (S[1], transfer command) to the memory card 5 based on an analyzed result in the command analyzing unit 4a (S32). The memory card command S[1] is composed of a reading instruction, a head logical address and the number of transfer sectors. In generating S[1], the command controller 4d changes the number of transfer sectors of S[1] into a sufficiently large value, for example, an infinite length (S32). A[1] is stored in the command storage unit 4b. the memory card 5 that receives S[1] executes the internal process such as referring to the logical-physical conversion table, afterwards issues a transfer authorization request packet (C1) to the memory card controller 4 via the interface D1 (see FIG. 2).

The control of reading of data (S33) is made by the flow controller 4g. First, when the transfer authorization request packet (C1) transferred from the memory card 5, if the memory card controller 4 can transfer the data, the flow controller 4g issues a transfer ready packet (B1) via an interface D0 (see FIG. 2) (S33). The memory card 5 that receives the transfer ready packet (B1) transfers data DAT[1-0] for 4 sectors (predetermined size) in data for 8 sectors specified by A[1] to the host apparatus 2 via the memory card adaptor 2. After the transfer of the data DAT[1-0] for 4 sectors, the memory card 5 issues a transfer authorization request packet (C2) in order to transfer residual data for 4 sectors. When the memory card controller 4 responds to the memory card 5 using a transfer ready packet (B2) (S34), data DAT[1-1] for 4 sectors is transferred from the memory card 5 to the host apparatus 1 via the memory card adaptor 2. When the data DAT[1-1] is transferred to the host apparatus 1, the memory card adaptor 2 asserts interrupt (E1) (S35), and ends the data transfer sequence related to A[1].

At this time, a transfer size in the command A[1] transmitted from the host apparatus 1 is 8 sectors, and a transfer size of the command S[1] issued by the memory card controller 4 is an infinite length. Therefore, the transfer sequence related to A[1] between the host apparatus 1 and the memory card adaptor 2 is completed, but the transfer sequence related to S[1] between the memory card adaptor 2 and the memory card 5 is not completed. For this reason, after the transfer of DAT[1-1], the memory card 5 issues a transfer authorization request packet (C3). Since no instruction is given from the host apparatus 1, the memory card adaptor 2 responds to the transfer authoring request packet (C3) using transfer busy packet (Busy)(B3) (S36). In this embodiment, the response is made by using the transfer busy packet (B3), but no response may not have to be made, or if defined, the response may be made by using an NOP (NO Operation) packet. These responding methods depend on protocols.

When interrupt (E1) is received, the host apparatus 1 issues A[2] to the memory card adaptor 2. A[2] is determined as the read command by the command analyzing unit 4a (S33) and is input into the continuity determination unit 4e. The continuity determination unit 4e collates (determines) continuity between a logical address specified by A[1] stored in the command storage unit 4b and a logical address specified by A[2] received from the host apparatus 1 (S37). Concretely, it is the collated (determined) whether the head logical address specified by A[2] is equal to the sum of the head logical address specified by A[1] and the number of transfer sectors.

That is to say, the determination is made whether the logical address of the last sector relating to A[1] is continuous with the logical address of the first sector relating to A[2]. In this embodiment, it is assumed that the logical address of the last sector relating to A[1] is continuous with the logical address of the first sector relating to A[2]. For this reason, the command start/end controller 4f instructs the flow controller 4g to continue the transfer. The flow controller 4g that is instructed to continue the transfer responds to the transfer authorization request packet (C3) issued by the memory card 5 using a transfer ready packet (Ready)(B4) (S38). As a result, the transfer is continued.

At this stage, A[1] stored in the command storage unit 4b is discarded, and A[2] is stored instead. The memory card 5 that receives the transfer ready packet (B4) reads the data DAT[2] for 4 sectors related to A[2], and transfers DAT[2] to the host apparatus 2 via the memory card adaptor 2. When the transfer of DAT[2] for 4 sectors is completed, the memory card adaptor 2 asserts interrupt (E2) to the host apparatus 1 (S39).

At this time, the transfer size of the command A[2] transmitted from the host apparatus 1 is 4 sectors, whereas the transfer size of the command S[1] issued by the memory card controller 4 is the infinite length. Therefore, the transfer sequence related to A[1] between the host apparatus 1 and the memory card adaptor 2 is completed, but the transfer sequence related to S[1] between the memory card adaptor 2 and the memory card 5 is not completed. For this reason, the memory card 5 issues a transfer authorization request packet (C4). Since no instruction is given from the host apparatus 1, the memory card adaptor 2 responds to the transfer authorization request packet (C4) using a transfer busy packet (Busy) (B5) (S40).

When data transfer is necessary after the reception of the interrupt (E2), the host apparatus 1 issues A[3] to the memory card adaptor 2. A[3] is determined as the read command by the command analyzing unit 4a (S41), and is input into the continuity determination unit 4e. The continuity determination unit 4e collates (determines) continuity between the logical address specified by A[2] referred to by the command storage unit 4b and a logical address specified by A[3] received from the host apparatus 1 (S41). Concretely, it is collated (determined) whether the head logical address specified by A[3] is equal to the sum of the head logical address specified by A[2] and the number of the transfer sectors. In this embodiment, it is assumed that the logical address of the last section related to A[2] is not continuous with the logical address of the first sector related to A[3]. Therefore, the command start/end controller 4f instructs the flow controller 4g to issue abort packet (B6) for the transfer authorization request packet (C4) issued by the memory card 5. Further, since the command start/end controller 4f issues a memory card command D[1] of the abort (S41) to aborts the infinite length transfer of S[1].

After the memory card command D[1] of the abort is issued (after a completing process is executed), the memory card adaptor 2 issues the memory card command S[3] related to A[3] to the memory card 5 (S42). The transfer size in S[3] is converted into a transfer size of the infinite length by the command controller 4d similarly to S[1] (S42). At this stage, A[2] stored in the command storage unit 4b is discarded, and A[3] is stored instead. After the internal process such as referring to the logical-physical conversion table is completed, the memory card 5 that receives S[3] issues a transfer authorization request packet (C5) to the memory card 5 in order to transfer data DAT[3].

The memory card adaptor 2 that receives the transfer authorization request packet (C5) issues a transfer ready packet (B7) to the memory card 5 (S43). The memory card 5 that receives the transfer ready packet (B7) reads the data DAT[3], and transfers DAT[3] to the host apparatus 1 via the memory card adaptor 2. When the transfer of the data DAT[3] for a several sectors is completed, the memory card adaptor 2 asserts interrupt (E3) to the host apparatus 1 (S44).

The transfer size in the command A[3] transmitted from the host apparatus 1 is 4 sectors, whereas the transfer size of the command S[3] issued by the memory card controller 4 is an infinite length. Therefore, the transfer sequence related to A[3] between the host apparatus 1 and the memory card adaptor 2 is completed, but the transfer sequence related to S[3] between the memory card adaptor 2 and the memory card 5 is not completed. For this reason, the memory card 5 issues a transfer authorization request packet (C6) (S45). Since no instruction is given from the host apparatus 1, the memory card adaptor 2 responds to the transfer authorization request packet (C6) using a transfer busy packet (Busy) (B8) (S45).

When a predetermined time passes after A[3] with no command being issued from the host apparatus 1, the memory card adaptor 2 starts a time-out process. Further, the memory card adaptor 2 issues an abort packet (B9) in response to a transfer authorization request packet (C6) from the memory card 5, and executes a completing process for the memory card command to finish the flow control (S45). The completing process related to the memory card command may not be executed by the abort packet (B9) of the flow control but may be executed by the memory card command.

As descried above, in this embodiment, the issue of the instruction command related to A[2] from the memory card controller 4 to the memory card 5 is not necessary. Accordingly, the internal process such as the process for referring to the logical-physical conversion table or the like is not necessary in the memory card 5.

In the memory card controller 4, a total time for a generating time of the instruction command to the memory card 5 issued in relation with the ATA command (command converting process) and the internal processing time such as the process for referring to the logical-physical conversion table in the memory card 5 or the like is denoted by u, and a data transfer time per sector is denoted by t. At this time, a transfer time of A[1] is (u+8×t), whereas a transfer time of A[2] is 4×t. Therefore, the time required for the transfer of A[1] to A[2] can be shortened as follows.

For example, when u=4×t,
a total transfer time is such that 4×t+8×t+4×t=16×t.

On the contrary, when the memory card command S[2] is issued according to A[2] like a conventional manner, the total transfer time is such that:

(4×t+8×t)+(4×t+4×t)=20×t.

Therefore, comparing the transfer speed in this embodiment with a conventional transfer speed, the ratio is 20×t/16× t, and thus, the transfer speed improves by 25%.

Further, as a state that satisfies (a head reading sector number in a current command)=(a head reading sector number in a previous command+the number of transfer sectors in the previous command) continues more, the transfer speed improves more greatly. For example, in the case that eight read commands for 4 sectors continue, a ratio of the transfer speed in this embodiment to a conventional transfer speed is 8×(4×t+4×t)/(4×t+8×4×t)=64/36, and thus the transfer speed improves by 78%.

2-3-4. Operation of the Memory Card Controller

An operation of the memory card controller 4 will be described below with reference to a flowchart in FIG. 6. The memory card controller 4 can be realized by dedicated hardware, but may be configured with a program described in a language readable by a computer and a microprocessor.

The command analyzing unit 4a waits for issue of the ATA command from the host apparatus 1 (step S1). When the command analyzing unit 4a receives the command from the host apparatus 1 (Yes at step S1), a type of the ATA command, a start address X[I] and the number of sectors Y[I] are decrypted (step S2), and then a state of the memory card 5 is detected (step S3).

In a case of a transfer completion state at step S3 (NO: a state that the transfer is not being prepared) (No at step S3), it is determined whether the received command is the read command (step S4). The command that is not the read command is a command that does not generate the reading of data from the memory card 5, for example, a command for obtaining attribute or the like of the memory card adaptor 2 by the host apparatus 1, namely, a command that does not require an access to the memory card 5, and a write command. When the received command is the read command (Yes at step S4), the read command of which transfer size is converted into infinite length is issued to the memory card 5 (step S5), and data is transferred until the number of transfer sectors reaches Y[I] (step S9). When the number of the transfer sectors reaches Y[I] (Yes at step S9), the flow controller 4g is instructed to respond as the transfer preparing state for transfer authorization request of the memory card 5. X[I]+Y[I] is substituted to X[J] (step S14), and transfer completion interrupt is generated to the host apparatus 1 (step S15). On the other hand, when the received command is not the read command (No at step S4), a command is issued to the memory card 5 with a protocol for the memory card 5 (step S6). When a process related to this command is completed (step S7), transfer completion interrupt is generated to the host apparatus 1 (step S8).

When the flow control is in busy state for transfer at step S3 (Yes), it is determined whether the received command is the read command and satisfies (x[I]=X[J]) (step S10). When the received command is the read command and satisfies the condition of (X[I]=X[J]) (Yes at step S10), the flow control for the transfer authorization is made so that the data transfer is restarted (step S12). When the data transfer continues until the number of the transfer sectors reaches Y[I] (No at step S13) and when the number of the transfer sectors reaches Y[I] (Yes at step S13), the flow control for transfer busy state is made, and X[I]+Y[I] is substituted to X[J] (step S14) so that transfer completion interrupt is generated to the host apparatus 1 (step S15). On the other hand, when the received command is the read command and does not satisfy the condition of (X[I]=X [J]) (No at step S10), the flow control for the transfer abort is made (step S11), and then the determination at step S4 is made. Hereinafter, the process is executed according to this determined result.

Flow control in the case that the interrupt is generated at step S8 (transfer completion state (state A)) is different from flow control in the case that the interrupt is generated at step S15 (transfer preparing state (state B)). Concretely, when the command is not received at step S1 (No), it is determined whether a current flow control state is the state A or state B (step S18). When the determined result is the state A, step 1 is executed. On the other hand, when the determined result is the state B, step S16 is executed. At step S16, it is determined whether a next command is not issued from the host apparatus 1 for a predetermined time after the generation of the interrupt in the host apparatus 1. When the next command is not issued for the predetermined time (Yes at step S16), the memory card controller 4 determines timeout, and makes the flow control of the transfer abort (step S17). On the other hand, when the predetermined time does not pass, step 1 is executed.

When the state of the flow control to the memory card 5 is transfer busy state and a subsequent command is not present, the timeout is detected and then the abort packet is issued so that the transfer authorization request packet of the flow control and a process related to the current command in the memory card 5 can be ended. As a result, the stable operation of the memory card 5 is enabled.

Figure 6:
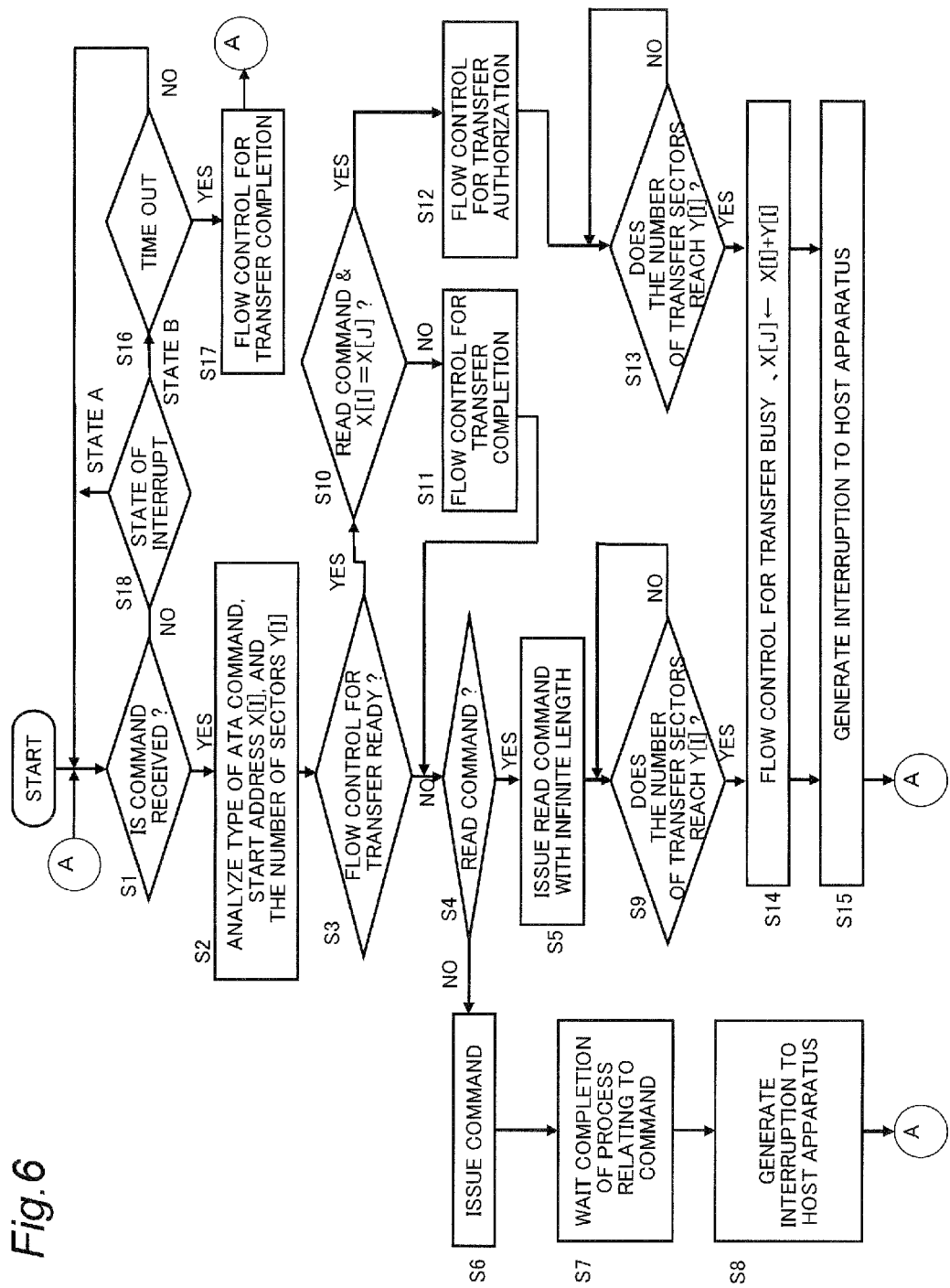
FIG. 6 is a flowchart illustrating a process in the memory card controller according to the embodiment.

In an example of the flow in FIG. 6, after the transfer preparing state in the flow control (Yes at step S3), the abort packet is issued (step S11), or the transfer authorization packet is issued (step S12). However, the commands may be classified into commands which generates the access to the memory card 5 is generated and command which does not generate the access is not generated. In the case of the command which does not generate the access to the memory card 5, the transition may be made in transfer preparing state in the flow control.

As a result, in case of that a command such as IDENTIFY-DEVICE is issued from the host apparatus 1 during issue of a plurality of the read commands, the transfer preparing state can be maintained. For this reason, overhead of a next read command can be eliminated.

It is advantageous to the transfer speed that the comparing process between X[J] and X[I] and the creating process of X[J] at step S10 and step S14 are executed during the data transfer where an influence of a microcomputer process delay is not generated.

3. Conclusion

The memory card controller 4 (the memory card adaptor 2) according to this embodiment controls the data transfer between the host apparatus 1 which issues a read command to request the data transfer and the memory card 5. The memory card controller 4 (the memory card adaptor 2) includes the command analyzing unit 4a, the flow controller 4g, the continuity determination unit 4e, and the command start/end controller 4f. The command analyzing unit 4a receives a read command from the host apparatus 1, the read command specifying a transfer size and a transfer start address of the data transfer. The flow controller 4g controls the data transfer with the memory card 5 by responding a transfer authorization request from the memory card 5. The continuity determination unit 4e determines continuity between a transfer end address specified by a read command previously received and a transfer start address specified by a read command received next in two read commands sequentially received from the host apparatus 1 via the command analyzing unit 4a. The command start/end controller 4f issues a transfer command to the memory card 5 according to the read command. When the command analyzing unit 4a receives a first read command, the command start/end controller 4f issues a transfer command to the memory card 5 to cause the memory card 5 to start the data transfer, while specifying a transfer start address specified by the first read command and a predetermined transfer size larger than a transfer size specified by the first read command. When size of the data transferred from the memory card 5 to the host apparatus 1 in response to the transfer command reaches the transfer size specified by the first read command, the command start/end controller 4f controls the flow controller 4g to transmit a response representing a transfer busy state to the transfer authorization request from the memory card 5, and pauses a transfer operation of the memory card 5. When the command analyzing unit 4a receives a second read command in a state that the transfer operation of the memory card 5 is paused and the continuity determination unit 4e determines that the transfer start address represented by the second read command is continuous with the transfer end address represented by the first read command, controls the flow controller 4g to transmit a response representing a transfer ready state to the transfer authorization request from the memory card 5 so as to restart a transfer operation of the memory card 5.

With such configuration, even in the case where the read commands from the host apparatus 1 are sequentially issued, when addresses specified by these read commands have continuity, the read command is issued to the memory card 5 only when the first read command is issued from the host apparatus 1. For this reason, a delay of the reading process caused by occurrence of overhead can be prevented.

Further, when the command analyzing unit 4a does not receive a third read command from the host apparatus 1 for a predetermined time after receiving the second read command while the transfer operation of the memory card 5 is paused, the command start/end controller 4f controls the flow controller 4g to transmit a response representing abort to the transfer authorization request from the memory card 5.

With such a configuration, the transfer authorization request of the flow control and a current command of the memory card 5 can be ended. Thus, the stable operation of the memory card 5 is enabled.

When reading of data from the memory card 5 according to the first read command ends, the command start/end controller 4f controls the flow controller 4g to transmit a response representing a transfer busy stat to the transfer authorization request from the memory card 5, pauses an operation of reading form the memory card 5 to notify the completion of the reading to the host apparatus 1. When the command received from the host apparatus 1 after the reception of the first read command is a command that does not generate an access to the memory card 5, the command start/end controller 4f maintains the reading from the memory card 5 in the paused state.

With such a configuration, when a next read command is issued, occurrence of command overhead caused by the read command can be prevented.

When the reading of data from the memory card 5 according to the first command ends, the command start/end controller 4f controls the flow controller 4g to transmit a response representing a transfer busy state to the transfer authorization request from the memory card 5, and pauses the operation of reading from the memory card 5 to notify completion of the reading to the host apparatus 1. When the command received from the host apparatus 1 after the reception of the first read command is not the read command, or when a reading start address of the second read command received from the host apparatus 1 after the reception of the first read command is not continuous with the reading end address of the first read command, the flow controller 4g controls the flow controller 4g to transmit a response representing abort to the transfer authorization request from the memory card 5, and ends the process of the first read command to restart the access to the memory card 5 corresponding to the second read command.

With such a configuration, the process of a command at the time when the second read command is not the read command can be securely executed. Further, the reading start address of the second read command is not continuous with the reading end address of the first read command, the logical-physical conversion table should be referred to, and thus the process related to this can be executed.

Another Embodiment

This embodiment described the case where the memory card is an SD card, but the present invention is not limited to this, and for example, the present invention can be applied widely to recording media which has a character that overhead occurs at the time of reading based on the read command. The present invention can be applied to, for example, compact flash cards, smart media, memory sticks and multimedia cards.

This embodiment described the case where the present invention is applied to the memory card adaptor 2, but the present invention can be applied also to a memory card drive containing at least one memory card for storing data.

In the memory card adaptor 2 according to this embodiment, a transfer size specified by the read command issued from the host apparatus 1 is converted into an infinite length size so as to be issued to the memory card 5. However, the converted transfer size is not limited to this. For example, the converted transfer size may be a maximum transfer size settable in the memory card 5. Further, the converted transfer size is not limited to the maximum transfer size and may be set to a comparatively large block size if a desired effect can be obtained.

In the memory card adaptor 2 according to this embodiment, the configuration is such that the memory card controller 4 is separated from the external interface unit 3, but the configuration may be such that the memory card controller 4 and the external interface unit 3 may be integrated.

INDUSTRIAL APPLICABILITY

In the memory card controller, the memory card adaptor and the memory card drive according to the embodiment, the transfer speed at the time of writing and reading into and from the memory card can be improved. Therefore, for example, the present invention can be applied suitably to a case where the memory card is used for an application of recording and reproducing of video data. For this reason, the memory card controller, the memory card adaptor, and the memory card drive according to the present invention might be used widely in video device industries related to manufacturing of video devices.

What is claimed is:

1. A memory card controller for controlling a data transfer between a host apparatus which issues a read command to request the data transfer and a memory card to which a transfer size and a transfer start address of the data transfer is instructed when the memory card controller receives the read command, the memory card controller comprising:
  a serial interface operable to receive data output from the memory card serially, the serial interface not providing a clock signal for the data transfer to the memory card;
  a receiver operable to receive the read command from the host apparatus, the read command specifying the transfer size and the transfer start address of the data transfer;
  a flow controller operable to control the data transfer with the memory card by responding to a transfer authorization request from the memory card;
  a continuity determination unit operable to determine continuity between (i) a transfer end address specified by a previously received read command and (ii) a transfer start address specified by a next received read command received next in two read commands sequentially received from the host apparatus via the receiver; and
  a command controller operable to issue a transfer command to the memory card according to the read command, wherein
  when the receiver receives, from the host apparatus, a first read command specifying a transfer start address, and a transfer size, the command controller issues the transfer command to the memory card to (i) cause the memory card to start the data transfer, (ii) specify the transfer start address specified by the first read command and (iii) specify a predetermined transfer size that is larger than the transfer size specified by the first read command, thereby causing the memory card to perform the data transfer according to the transfer start address and the predetermined transfer size specified by the transfer command,
  when a size of the data transferred from the memory card to the host apparatus in response to the transfer command reaches the transfer size specified by the first read command, the command controller controls the flow controller to transmit a response representing a transfer busy state to the transfer authorization request from the memory card, thereby pausing a transfer operation of the memory card, and
  when the receiver receives a second read command specifying a transfer start address in a state that the transfer operation of the memory card is paused and the continuity determination unit determines that the transfer start address specified by the second read command is continuous with the transfer end address represented by the first read command, the command controller controls the flow controller to transmit a response representing a transfer ready state to the transfer authorization request from the memory card, thereby restarting the transfer operation of the memory card.

2. The memory card controller according to claim 1, wherein the predetermined transfer size is an infinite length.

3. The memory card controller according to claim 1, wherein the predetermined transfer size is a maximum value of a data transfer size settable in the memory card.

4. The memory card controller according to claim 1, wherein, when the receiver does not receive a third read command from the host apparatus for a predetermined time after receiving the second read command while the transfer operation of the memory card is paused, the command controller controls the flow controller to transmit a response representing abort to the transfer authorization request from the memory card.

5. The memory card controller according to claim 1, wherein
  when the data transfer from the memory card according to the first read command ends, the command controller controls the flow controller to transmit a response representing the transfer busy state to the transfer authorization request from the memory card, thereby pausing the transfer operation of the memory card to notify completion of the reading to the host apparatus, and
  when the command received from the host apparatus after the reception of the first read command is a command that does not generate an access to the memory card, the command controller maintains the data transfer from the memory card in the paused state.

6. The memory card controller according to claim 1, wherein
  when the data transfer from the memory card according to the first read command ends, the command controller controls the flow controller to transmit a response representing the transfer busy state to the transfer authorization request from the memory card, thereby pausing the data transfer operation the memory card to notify completion of the data transfer to the host apparatus, and
  when the command received from the host apparatus, after the reception of the first read command, is not a read command, or when the transfer start address of the second read command received from the host apparatus after the reception of the first read command is not continuous with a reading end address of the first read command, the command controller controls the flow controller to transmit a response representing abort to the transfer authorization request from the memory card, thereby ending the process of the first read command to restart the access to the memory card corresponding to the second read command.

7. A memory card adaptor for controlling a data transfer between a host apparatus and a memory card, the memory card adaptor comprising:
   a card slot to which the memory card is attachable;
   the memory card controller according to claim 1 operable to control the data transfer from the memory card; and
   an external interface unit operable to transmit and receive data and commands to and from the host apparatus.

8. A memory card drive for transferring data according to a request from the host apparatus, the memory card drive comprising:
   a memory card operable to store data;
   the memory card controller according to claim 1 operable to control the transfer of data from the memory card; and
   an external interface unit operable to transmit and receive data and commands to and from the host apparatus.

9. The memory card controller according to claim 1, wherein the response representing the transfer busy state is a packet representing the transfer busy state, and the response representing the transfer ready state is a packet representing the transfer ready state.

* * * * *